Dec. 18, 1928.

J. R. McGIFFERT 1,695,498

WINDING ENGINE

Filed Dec. 16, 1925

2 Sheets-Sheet 1

INVENTOR.
John R. McGiffert.
By Fay, Oberlin & Fay
ATTORNEYS.

Dec. 18, 1928.

J. R. McGIFFERT
WINDING ENGINE
Filed Dec. 16, 1925

1,695,498

2 Sheets-Sheet 2

INVENTOR.
John R. McGiffert
BY
Ray Oberlin & Fay
ATTORNEYS

Patented Dec. 18, 1928.

1,695,498

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MAINE.

WINDING ENGINE.

Application filed December 16, 1925. Serial No. 75,712.

This invention relates to winding engines, and more particularly winding devices capable of ready transport irrespective of the character of the ground surface over which they are to be used. Where logging or stump-pulling operations, for example, are carried on in uneven and hilly countries, sections are frequently encountered which are too rough to be profitable for standard equipment. An equipment which is light and readily transportable and is sufficiently flexible or rockable in its framing to allow of ready use over rough ground is accordingly highly desirable. To the accomplishment of the foregoing and related objects therefor, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
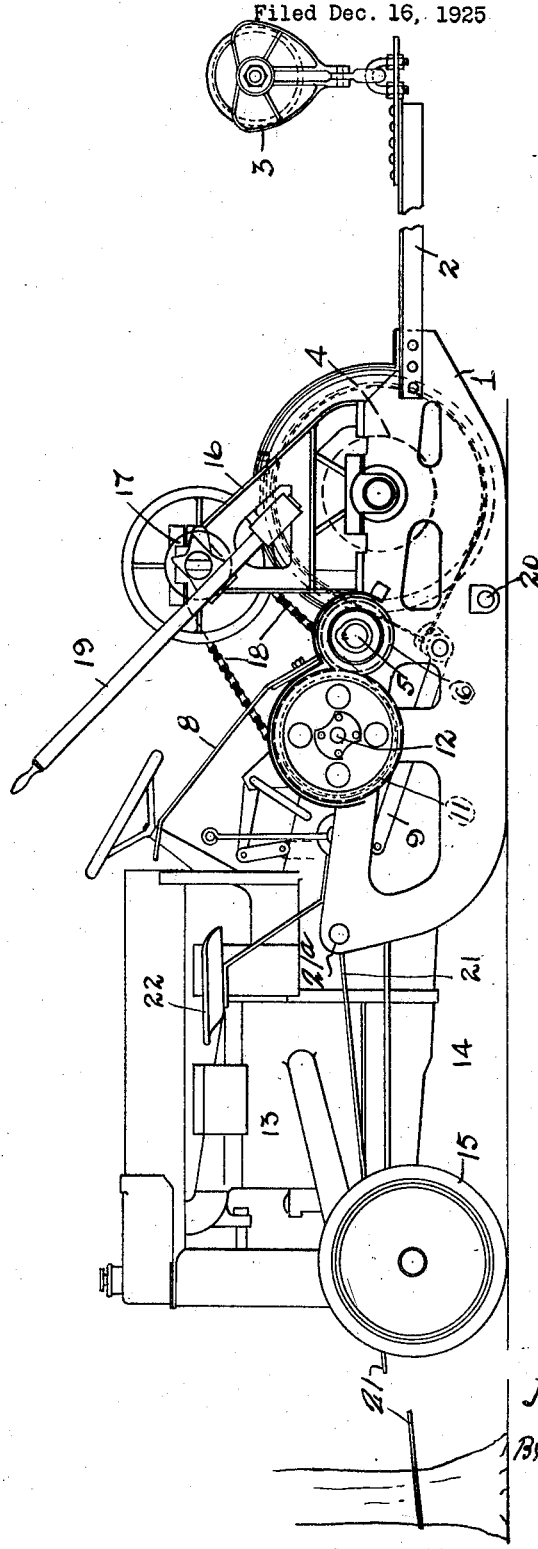
Figure 2:
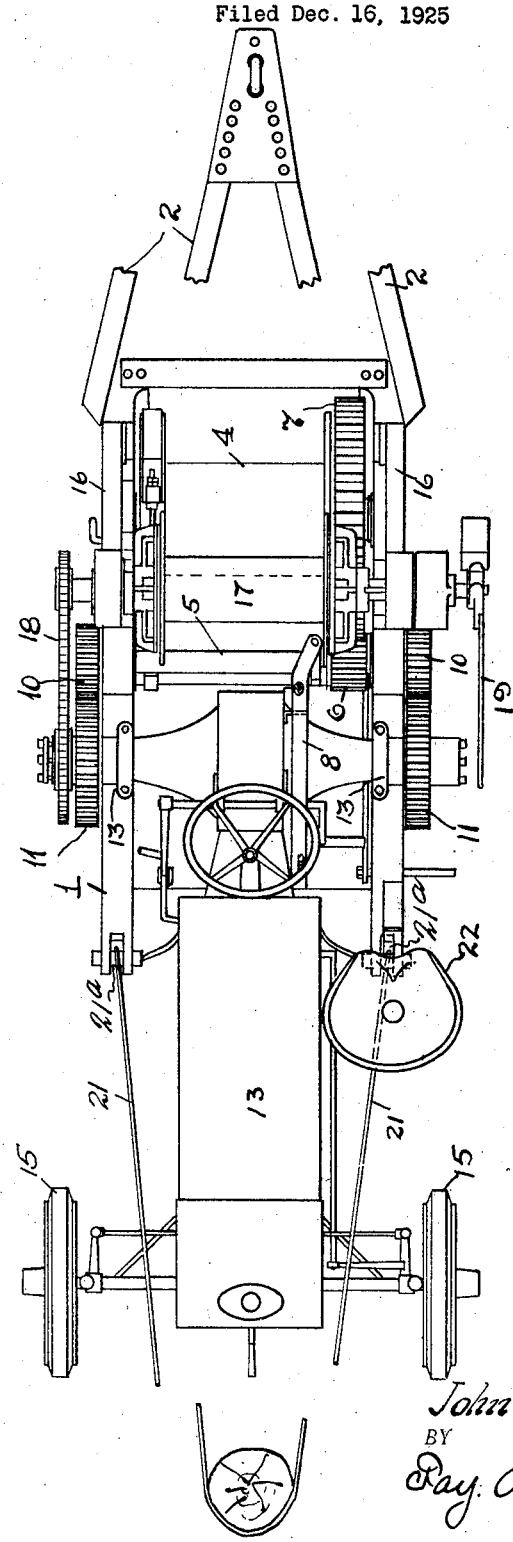

Fig. 1 is a side elevation of a construction embodying my invention; and Fig. 2 is a plan view thereof.

Referring more in detail to the drawing, the numeral 1 designates a sled-like skid which may be made in one piece, or more advantageously may be built up of steel side members united by cross girts and having a plate-like bottom extending up well at each end, thus providing protection of the working parts from dirt and obstructions. Extending from the skid, preferably substantially horizontally at one end, is an outrigger 2 which preferably is constructed of members united in a braced or V shape and adapted to carry at the extremity a cable directing-guide 3 of any suitable form. Mounted within the skid is a winding-drum 4, this being arranged to be driven from a shaft 5, through gears 6 and 7, and having a suitable clutch controlled by a lever 8 and a brake band controlled by a lever 9. The shaft 5 is driven through the intermediary of the gear 10 by gear 11 on the main power shaft 12. This power shaft is arranged in a portable power unit comprising a motor 13 on a frame 14 which is supported from the ground at one end by wheels 15 equipped for steering and controlled by a steering column and wheel of any usual or desired character. Advantageously such portable power unit may be adapted from a motor driven vehicle, preferably of tractor type such as may be had commercially, and to flexibly connect such power unit with the skid, I mount the power shaft 12 in bearings 13 in said skid, no other connection being employed. Where a commercial motor driven vehicle is used, the rear wheels thereof are removed and the rear axle constitutes the drive shaft 12 as shown. Gearing 11 and 10 thus serves to transmit power from the shaft 12 to the drum 4, and the rate of transmission can be varied as desired by means of the gear set embodied in the power unit. Mounted above the bearings of the drum 4, there may be additionally provided an auxiliary frame 16 in which there is a second drum 17 which may be driven from the source of power by suitable intermediary connections but which preferably will comprise a chain belt 18. This second drum is controlled by a thrust clutch having a handle 19. If the auxiliary frame and second drum are not desired, the main drum bearings are simply capped over with bearing blocks of usual or conventional form. A seat 22 is provided so as to be mounted to face either toward the steering column when the tractor in particular is being used or to be faced toward the drum when the drum end is in use for pulling or for travelling on the skid.

In use, the assembly may be transported by the power unit equipped with its usual rear wheels for traction and the skid may be hitched onto the draw bar by the outrigger 2 and may be thus drawn along sled-wise or where desired a shaft and bogie truck wheels may be attached to the skid at the openings 20 provided for such purpose. To set up the apparatus for winding or pulling use in connection with logs or the like the rear wheels of the power unit are removed and the axle is set into the bearings provided therefor in the skid and gear wheels 11 are arranged to mesh with the gears 10 on the shaft 5. The power unit is thus seen to have no other connection with the skid than the axle or shaft mounting 12, and by virtue thereof, the device is so flexible or rockable in its longitudinal direction that it is readily susceptible of being drawn over rough ground by means of the windup cable extending from the drum through the directing-guide 3 to some fixed object as a tree or the like.

In this manner, the entire assembly may be drawn from one set-up location to another, the steering wheels 15 being used to give the necessary direction to the device as it is so drawn along. Having reached the location desired for further operation, the winding cable is run out to the point of action and the device is held in stable position by a cable or the like 21, which is passed about a tree or other anchorage point and is attached at each of its ends to the connections 21ª therefor provided on the forward end of the skid. These anchor connections, it will be noted, lie in a plane somewhat higher than that in which lies the axis of drum 4; consequently the resultant of the forces to which the skid is subjected is always downwardly when the cable or drum is being wound in, i. e. is under tension. In other words, the stability of the machine does not depend on the tractor at all, but upon the anchor connections and stress on the pulling line does not tend to raise the skid. Having completed operations at such set-up location, the entire assemblage may again be moved by passing the wind up cable through the direction-guide 3 to a fixed point, the device thus being drawn along as desired.

It will thus be seen that as a whole the assemblage provides a construction which may be used in any desired set position for drawing logs or other pulling operation, and which is readily capable of being moved from such position when desired either by being drawn along on the sled-like skid by the wind up cable, or for longer moves the traction wheels may be applied to the power unit and the skid may be attached to the draw bar and be towed along either on the sled-like base or on truck wheels as already indicated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination of a winding drum, means for supporting said drum and for supporting the traction end of a motor-driven vehicle, said means comprising a skid non-rigidly and rockably connected to such vehicle by bearings adapted to receive the rear axle of such vehicle, means for communicating power from such axle to the said drum, and an outrigger and cable-guide projecting from the skid at one end.

2. In apparatus of the character described, the combination of a winding drum, means for supporting said drum and for supporting the traction end of a motor-driven vehicle, said means comprising a skid non-rigidly and rockably connected to such vehicle by bearings adapted to receive the rear axle of such vehicle, means for communicating power from such axle to the said drum, anchor connections for stabilizing the skid, said connections lying in a plane higher than that of said drum, and an outrigger and cable-guide projecting from the other end.

3. In apparatus of the character described, the combination of a winding drum, means for supporting said drum and for supporting the traction end of a motor-driven vehicle, said means comprising a skid non-rigidly and rockably connected to such vehicle by bearings adapted to receive the rear axle of such vehicle, an auxiliary frame on the skid, a second winding drum mounted in said frame, and means for communicating power from such aforesaid axle to the drums.

4. In apparatus of the character described, the combination of a winding drum, transporting and power means including a motor and a frame therefor, means for supporting said drum and for supporting one end of such frame, said means comprising a skid non-rigidly and rockably connected to the frame by the intermediary of a power shaft journaled in the frame and in the skid, the other end of the frame being supported on the ground by steering wheels.

5. In apparatus of the character described, the combination of a skid, a winding drum journaled in said skid, an auxiliary frame set over the journals of said drum, a second winding drum mounted in said auxiliary frame, and means whereby said skid may be flexibly connected to a motor-driven vehicle to receive driving-power therefrom for said drums, said means comprising bearings in the skid adapted to receive the rear axle of such motor-driven vehicle.

6. In apparatus of the character described, the combination of a skid, an outrigger projecting therefrom at one end, anchor connections at the other end, a winding drum journaled in said skid, an auxiliary frame set over the journals of said drum, a second winding drum mounted in said auxiliary frame, and means whereby said skid may be flexibly connected to a motor-driven vehicle and receive driving-power therefrom for said drums, said means comprising bearings in the skid adapted to receive the rear axle of such motor-driven vehicle.

7. In apparatus of the character described, the combination of a skid, a winding drum journaled in said skid, an auxiliary frame set over the journals of said drum, a second winding drum mounted in said auxiliary frame, and transporting and power means including a motor and a frame therefor, said frame being supported on the ground at one end by steering wheels and at the other end being flexibly connected to said skid through the intermediary of the power shaft journaled in said frame and in said skid.

8. In apparatus of the character described, the combination of a skid, an outrigger projecting therefrom at one end, a winding drum journaled in said skid, an auxiliary frame set over the journals of said drum, a second winding drum mounted in said auxiliary frame, and transporting and power means including a motor and a frame therefor, said frame being supported on the ground at one end by steering wheels and at the other end being flexibly connected to said skid through the intermediary of a power shaft journaled in said frame and in said skid.

Signed by me this 12th day of December, 1925.

JOHN R. McGIFFERT.